United States Patent [19]

Jensen et al.

[11] Patent Number: 5,028,218
[45] Date of Patent: Jul. 2, 1991

[54] IMMERSION PUMP ASSEMBLY

[75] Inventors: Niels D. Jensen; Poul E. Mikkelstrup, both of Bjerringbro, Denmark

[73] Assignee: Grundfos International A/S, Bjerringbro, Denmark

[21] Appl. No.: 361,224

[22] Filed: Jun. 5, 1989

[30] Foreign Application Priority Data

Jun. 11, 1988 [DE] Fed. Rep. of Germany ....... 3820003

[51] Int. Cl.⁵ ............................................. F04D 13/08
[52] U.S. Cl. ................................. 417/423.3; 417/366; 417/423.7; 417/423.8
[58] Field of Search ..................... 417/366, 368, 423.3, 417/423.5, 423.7, 423.8, 424.2

[56] References Cited

U.S. PATENT DOCUMENTS

| | | | |
|---|---|---|---|
| 2,120,914 | 6/1938 | Vogel | 417/368 X |
| 3,242,360 | 3/1966 | Carle | 417/423.3 X |
| 3,933,416 | 1/1976 | Donelian | 417/423.7 X |
| 4,456,437 | 6/1984 | Kurahayashi et al. | 417/368 |
| 4,834,624 | 5/1989 | Jensen et al. | 417/369 |

FOREIGN PATENT DOCUMENTS

| | | |
|---|---|---|
| 614536 | 6/1935 | Fed. Rep. of Germany . |
| 1453799 | 12/1971 | Fed. Rep. of Germany . |
| 2516575 | 10/1976 | Fed. Rep. of Germany ...... 417/366 |
| 3520360 | 12/1986 | Fed. Rep. of Germany ...... 417/366 |
| 215038 | 6/1969 | U.S.S.R. ............................ 417/423.3 |
| 1265395 | 10/1986 | U.S.S.R. ............................ 417/366 |

Primary Examiner—Gerald A. Michalsky
Attorney, Agent, or Firm—Dvorak and Traub

[57] ABSTRACT

An immersion pump assembly comprises a pump and a wet-rotor motor driving the pump and having a common hollow spindle for the motor and the pump. Liquid in the wet-rotor compartment of the motor can be introduced into the spindle and conveyed within the spindle into the pump casing in heat exchange relationship with the liquid conveyed by the pump, by way of the wall of the spindle. The liquid is returned from the spindle into the rotor compartment by a pumping action. The exit and return openings for the liquid in the rotor compartment are spaced from each other axially of the pump assembly.

10 Claims, 5 Drawing Sheets

IMMERSION PUMP ASSEMBLY

FIELD OF THE INVENTION

The invention relates to an immersion pump assembly comprising a pump, a wet-rotor motor for driving the pump, and a pump drive spindle common to the motor and the pump.

Immersion pump assemblies are machine assemblies which are temporarily or permanently located in a liquid to be conveyed by the pump assembly. Such pump assemblies are also referred to as underwater motor pumps where they are for installation in bored wells, in the water to be conveyed, and it is to such pumps that the present invention is especially applicable.

BACKGROUND OF THE INVENTION

Since the cost of a well increases with the bore diameter, it is desirable for pump assemblies to be of small external diameter and high rotational speed in order to secure the same pumping performance as with a pump of a lower rotational speed but of larger external diameter. Such a smaller diameter high speed pump assembly is subject to greater stress on the pump motor, with the attendant problem of dissipating resistance losses occurring in the pump motor.

Frequency changers comprising an operating electronic system are frequently used for augmenting the speed of rotation of pump motors. If such a frequency changer is an integrated component of the pump motor, the supplementary problem arises that heat losses of said electronic system need to be dissipated.

SUMMARY OF THE INVENTION

The invention concerns the problem of improving the dissipation of the waste heat generated during operation of an immersion pump assembly, thereby to lower the temperature of said electronic system and that of the windings of the pump driving motor.

According to the invention, therefore, the liquid in the wet rotor compartment of the motor is introduced into the pump drive spindle which is hollow and is impelled within the spindle into the pump casing, where it is placed in heat exchange relationship with the liquid conveyed by the pumping set, by way of the wall of the spindle. The liquid is lead back into the rotor compartment from the spindle under a pumping action. The liquid intake and return points in the rotor compartment are spaced from each other axially of the pump assembly.

That part of the spindle which projects into the pump may act as a rotating heat exchange surface having an extremely high degree of heat transfer under positive convection. A conveyor screw may be used to cause liquid to flow into the hollow spindle to increase the volume of liquid flowing therethrough.

The conveyor screw may be a wire coil inserted into the spindle. The pumping action of the wire coil, may be augmented by providing it with a core, whereby all of the motor coolant liquid is impelled over the wire coil from end of the spindle. The wire coil, whether or not it is provided with the core, is held in position in the hollow spindle by outwardly acting radial spring forces, originated by pulling on the coil axially before inserting it into the hollow spindle.

Advantageously, a tube is inserted into the spindle, the spindle being closed by a freeable closure member at its upper or pump-side end. At least one intermediate radial space which is open at the pump-side end and closed at the motor-side end, is defined between the tube and the inner surface of the spindle. The end of the tube remote from the pump, which provides intake means for the liquid, is in communication with the rotor compartment. The spindle has at least one return point for the liquid, in the form of a perforation which is in communication with a part of the rotor compartment, which is proximate to the pump.

The tube in the spindle is preferably cylindrical and of optional cross-section, at least three generatrices of its external periphery being in contact with the inside of the spindle in the area of the pump.

The tube may advantageously be made of plastics material of low heat conductivity so that heat is most efficiently withdrawn from the cooling liquid into the heat sink constituted by the liquid conveyed by the pump.

The spindle may, for improved economy, be in the form of a polygonal tube within the pump, the pump impeller vanes being connected to the spindle by interfitting joints so as to be rotatable with the spindle but axially movable with respect thereto.

The spindle is preferably a cylindrical tube of circular cross-section, within the motor, so that the spindle can be journaled in a conventional manner in the area of the motor.

The impeller vanes on the spindle increase its surface area thereby further reducing thermal resistance.

A frequency changer may be integrated into the motor, being preferably installed on the lower end of the motor, so that waste heat generated by the electronic power stage of the frequency changer can be drawn off by the liquid conveyed by the hollow spindle.

BRIEF DESCRIPTION OF THE DRAWINGS

As shown in FIG. 1, the immersion pump assembly comprises a casing 1 produced from a rolled material, a double-walled tube in the form of a closed pot 2, a stack of rotor laminations 8 and a stack of stator laminations 3 surrounding it. Stator winding heads 34 and 35 are shown in the lower part of the pump assembly.

Figures 1, 4:
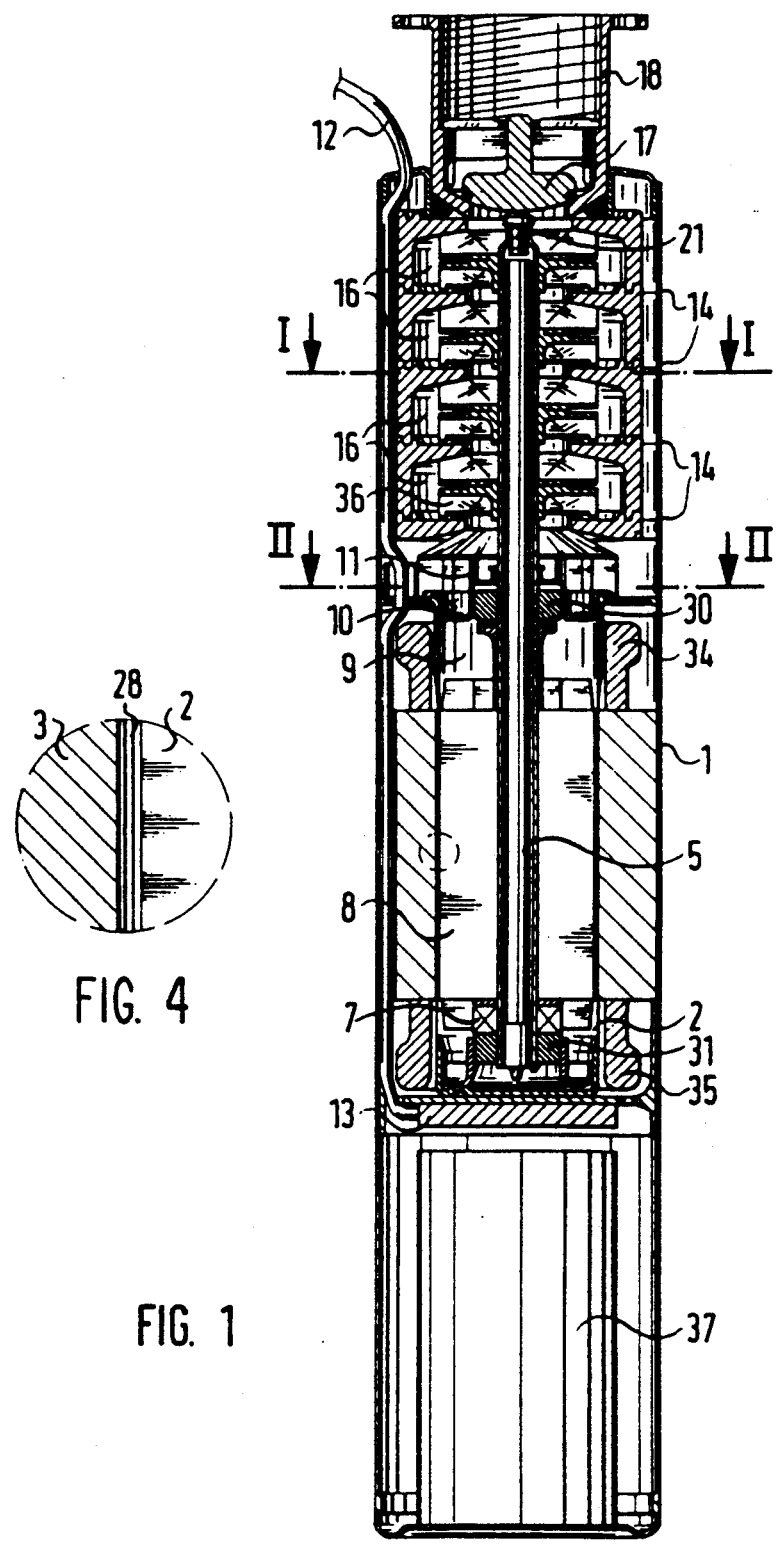
FIG. 1 is an axial sectional view of an immersion pump assembly.
FIG. 4 shows an enlarged view of a detail of the pump assembly.

A common spindle 5 of the motor and of a multistage pump of the assembly is located by means of radial bearings 30 and 31 and a thrust bearing 7. The spindle 5 carries the rotor laminations 8 which are contained within the pot 2.

The rotor compartment 9 of the motor is bounded by a wall 10 with a joint 11, so that the rotor compartment 9 is separated from the water to be conveyed by the pump assembly.

The pump assembly is connected to an electrical supply source means of a cable 12. During operation of the pump assembly electric current reaches the stator windings of the motor by way of a frequency changer 13.

Figure 2:
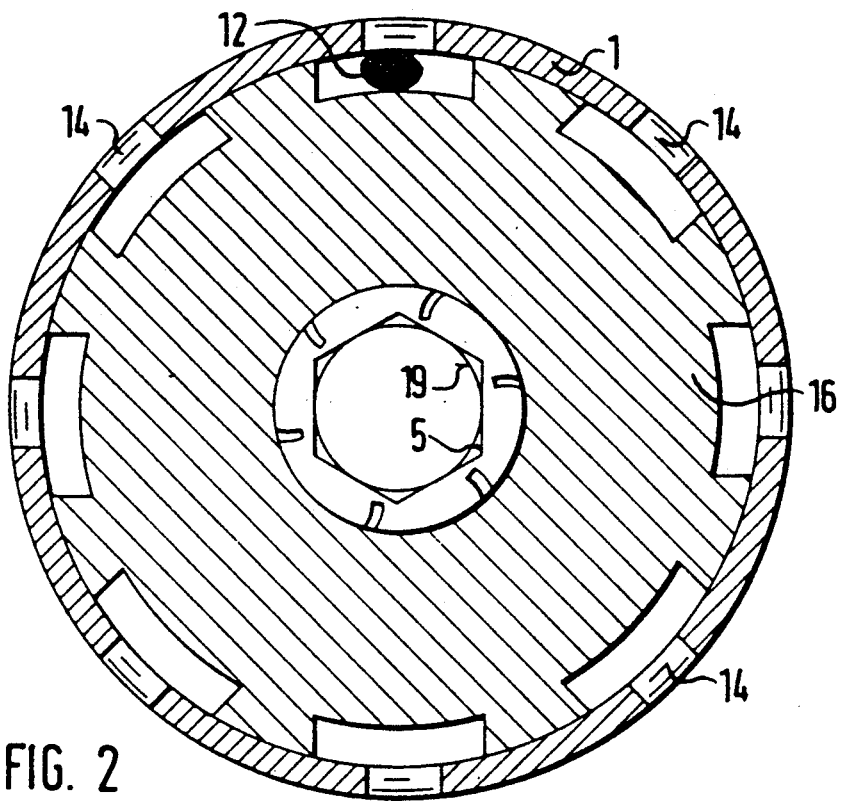
FIG. 2 is an enlarged cross-sectional view taken on the lines A—A in FIG. 1.

The pump draws in water via suction slots 14 in the casing 1. As best seen in FIG. 2, the pump is so formed that passages are established between the compartments 16 of each stage of the pump and the casing 1.

The water to be conveyed is impelled by the rotor 36 of each pump stage, of which four are shown in FIG. 1, into the compartment 16 thereof and is fed to the rotor of the next following pump stage by way of return blading.

After flowing through all of the pump stages, the water leaves the pump assembly by way of a check valve 17, through a delivery connector 18.

The casing 1, the suction slots 14 and a compartment 16 of a stage of the pump are best seen in FIG. 2.

As shown in FIG. 2, the spindle 5 is of hexagonal cross-section in the area of the pump. A circular cross section tube 19 which bears by way of its external diameter against the inside of the spindle 5 in the area of the pump, is inserted into the spindle 5, passages 20 being thereby established between the outside of the tube 1 and the inside of the spindle 5. The passages 20 are closed at the lower end of the spindle 5, that is to say at its end facing away from the pump, but are open at the other end. The spindle 5 is closed at its pump end by a freeable closure member, shown as a plug 21 in FIG. 1. This allows, when the pump assembly is being installed, the motor cooling circuit to be filled, the circuit not being in exchange relationship with the water to be conveyed.

Figure 3:
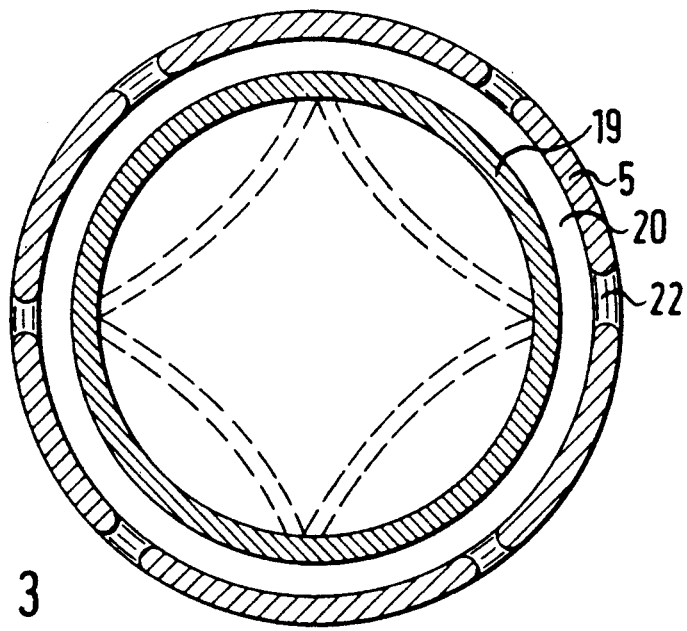
FIG. 3 is an enlarged cross-sectional view of the pump assembly taken on the lines B—B in FIG. 1.
Figure 6:
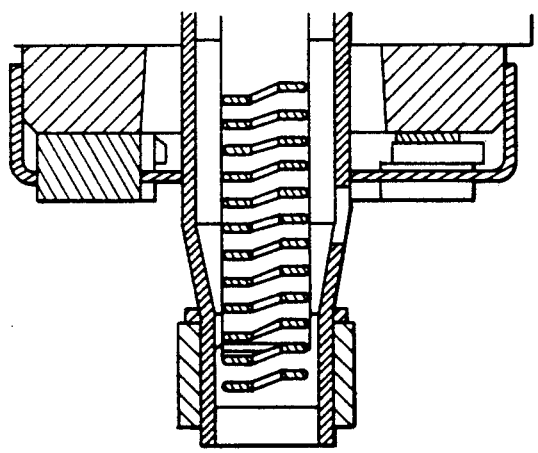
FIG. 6 shows an enlarged view of a detail of the liquid conveying screw.
Figure 5:
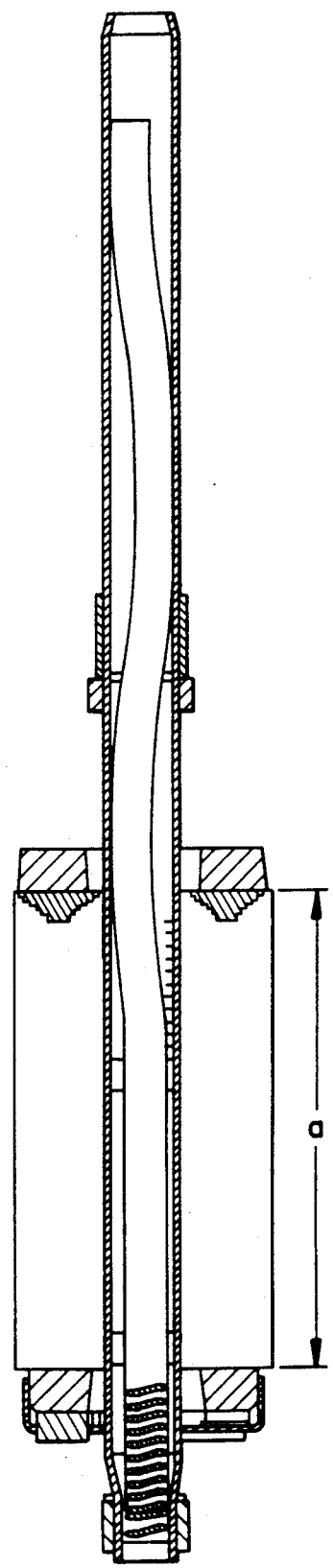
FIG. 5 shows an embodiment wherein said spindle contains a liquid conveying screw.
Figure 8:
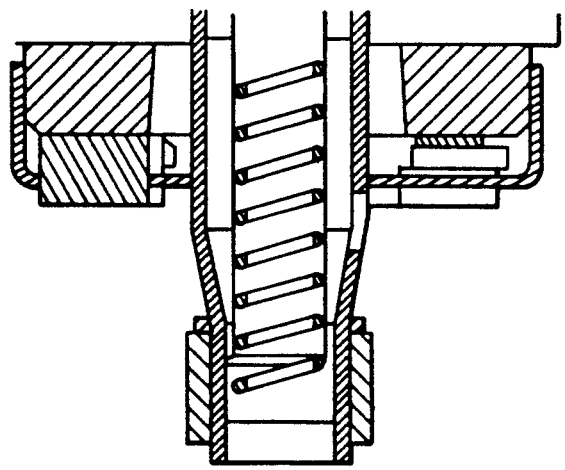
FIG. 8 shows an enlarged view of the wire coil.
Figure 7:
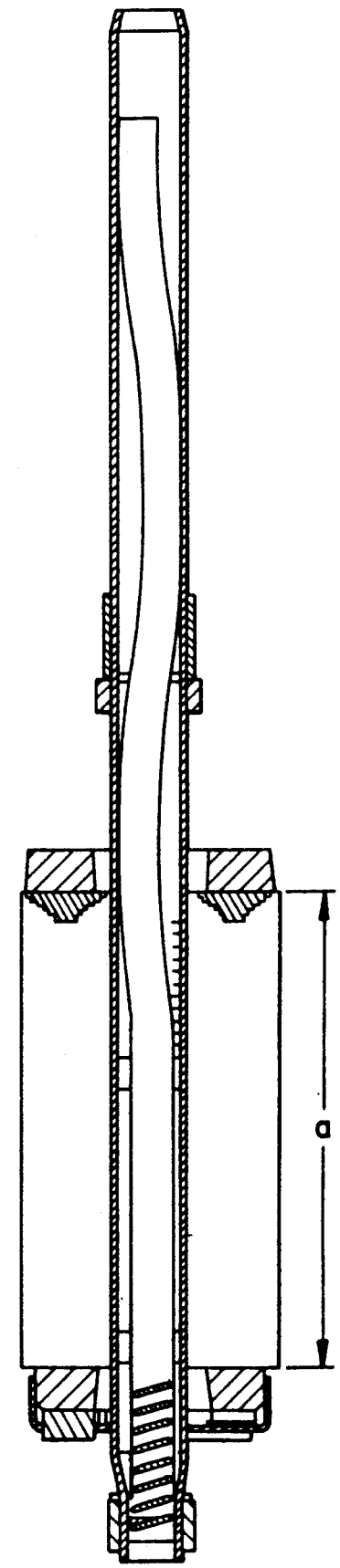
FIG. 7 shows an embodiment wherein said screw is in the form of a wire coil in the spindle.
Figure 10:
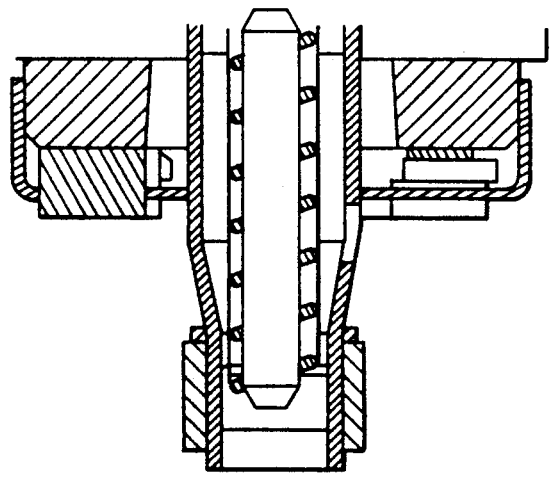
FIG. 10 shows an enlarged view of the impelling means.
Figure 9:
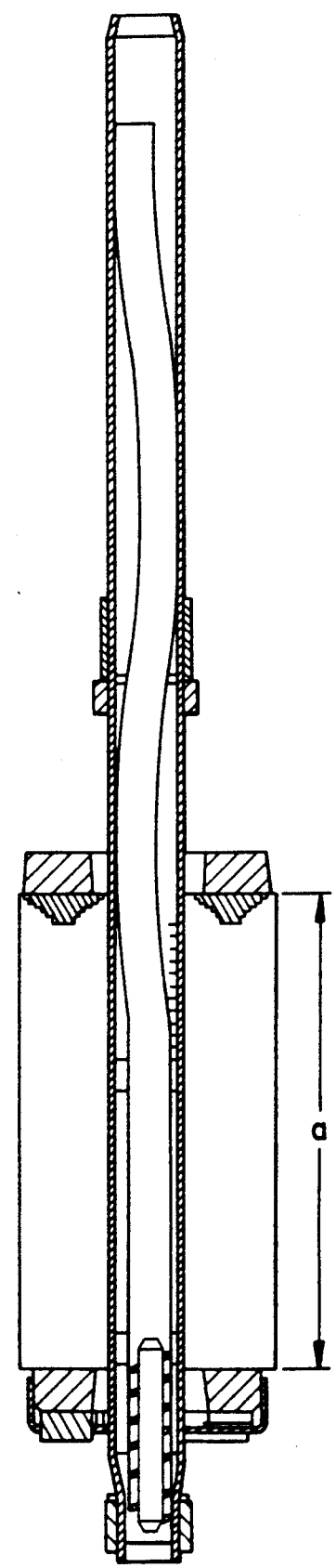
FIG. 9 shows an embodiment wherein the impelling means comprises the spindle.

As indicated in broken lines in FIG. 3, the tube 19 may in accordance with a modification, be a cylindrical tube of optional cross-section for the purpose of increasing the cross-section of the passages 20 but, however bearing with at least three generatrices of its external periphery against the inside of the spindle 5.

During its rotation, the spindle 5 acts as a rotary pump which draws motor cooling liquid from the rotor compartment 9 at its motor-side end. Such liquid then penetrates the passages 20 at the upper end of the spindle 5, after traversing the spindle 5. The motor cooling liquid which is cooled on its way through the pump casing 1 re-enters the rotor compartment 9 through holes 22 drilled through the largest diameter part of the spindle 5, at the level of the lines B-B FIG. 1. The motor cooling liquid thus passes into the space sealed off from the water to be conveyed buy means of the joint 11. From such upper part of the rotor compartment 9, the motor cooling fluid flows along the split-tubular pot 2 into the lower part of the rotor compartment 9, being drawn again into the hollow spindle 5 by the vacuum action thereof and pumped upwards through the interior thereof A passage 28 for the cooling fluid along the split-tubular pot 2 is shown in the enlarged view in FIG. 1.

The motor cooling fluid absorbs the motor waste heat and that of the frequency changer 13, within the rotor compartment 9. A capacitor 37 pertaining to the frequency changer 13 is shown in FIG. 1. According to a modification, the frequency changer is battery operated, the capacitor 37 being replaced by an inductance.

A conveyor worm or screw, which may be in the form of a wire coil, may be inserted into the circular tube 19 at the lower end of the spindle 5 to increase the rate of flow of the motor coolant. In order to increase the pumping action of such a wire coil, it may be provided with a core acting as a plug so that the whole of the motor cooling fluid will perforce be conveyed over the wire coil, to the pump-side end of the spindle 5. The wire coil which acts as a conveyor screw, is held in position in the spindle 5, by outwardly directed radial forces generated by the spring force of said coil.

What is claimed is;

1. An immersion pump assembly comprising a pump casing, a pump, a wet-rotor motor for driving the pump, said motor having a wet-rotor compartment, and a spindle which is common to said motor and said pump; wherein the spindle is hollow, the pump assembly further comprising intake means in said compartment for introducing liquid therein into the hollow spindle; means for impelling, with a pumping action, liquid along said spindle into heat exchange relationship, in said casing, by way of the wall of the hollow spindle, with liquid conveyed by said pump and means in said rotor compartment, spaced axially from said intake means, for returning the liquid in said spindle to said rotor compartment under said pumping action.

2. A pump assembly as claimed in claim 1, wherein said impelling means comprises said spindle.

3. A pump assembly as claimed in claim 2, wherein said spindle contains a liquid conveying screw.

4. A pump assembly as claimed in claim 3, wherein said screw is in the form of a wire coil in the spindle.

5. A pump assembly as claimed in claim 3, wherein said screw is in the form of a wire in said spindle the wire surrounding a core.

6. An immersion pump assembly comprising a pump casing, a pump, a wet rotor motor for driving said pump, said motor having a wet-rotor compartment, a hollow spindle common to said motor and said pump, intake means in said compartment for introducing liquid therein into said hollow spindle, means for impelling liquid along said spindle into heat exchanging relationship in said casing, via a wall of said hollow spindle, with liquid conveyed by said pump, means for returning liquid in said spindle to said rotor compartment, said means for returning liquid being disposed in said rotor compartment and spaced axially from said intake means, a tube having an upper and a lower end disposed in said spindle, detachable closure means disposed at an upper end of said spindle, said spindle and said tube defining at least one intermediate radial space having an upper and a lower end, said upper end of said radial space being disposed in said pump casing and being open, said lower end of said radial space being disposed in said rotor compartment and being closed, said lower end of said tube disposed remotely from said pump and communicating with said rotor compartment to provide intake means, said spindle having at least one perforation providing said return means, said spindle communicating with said rotor compartment at a position proximate said pump.

7. A pump assembly as claimed in claim 6, wherein said at least one perforation opens into a space surrounding a radial spindle baring in said rotor compartment, proximate to the pump.

8. A pump assembly as claimed in claim 6, wherein said tube which is coaxial with said spindle is in the form of a cylinder with a cross-sectional shape having at least three generatrices of its outer circumference in contact with the interior of said hollow spindle.

9. A pump assembly as claimed in claim 8, wherein said spindle is of circular cross-sectional shape in said rotor compartment and is of polygonal cross-sectional shape and within said pump.

10. A pump assembly as claimed in claim 6, wherein said tube is made of a plastics material.

* * * * *